No. 729,821. PATENTED JUNE 2, 1903.
J. F. WEITZEL.
DRINKING TROUGH FOR DOMESTIC ANIMALS.
APPLICATION FILED AUG. 18, 1902.
NO MODEL.
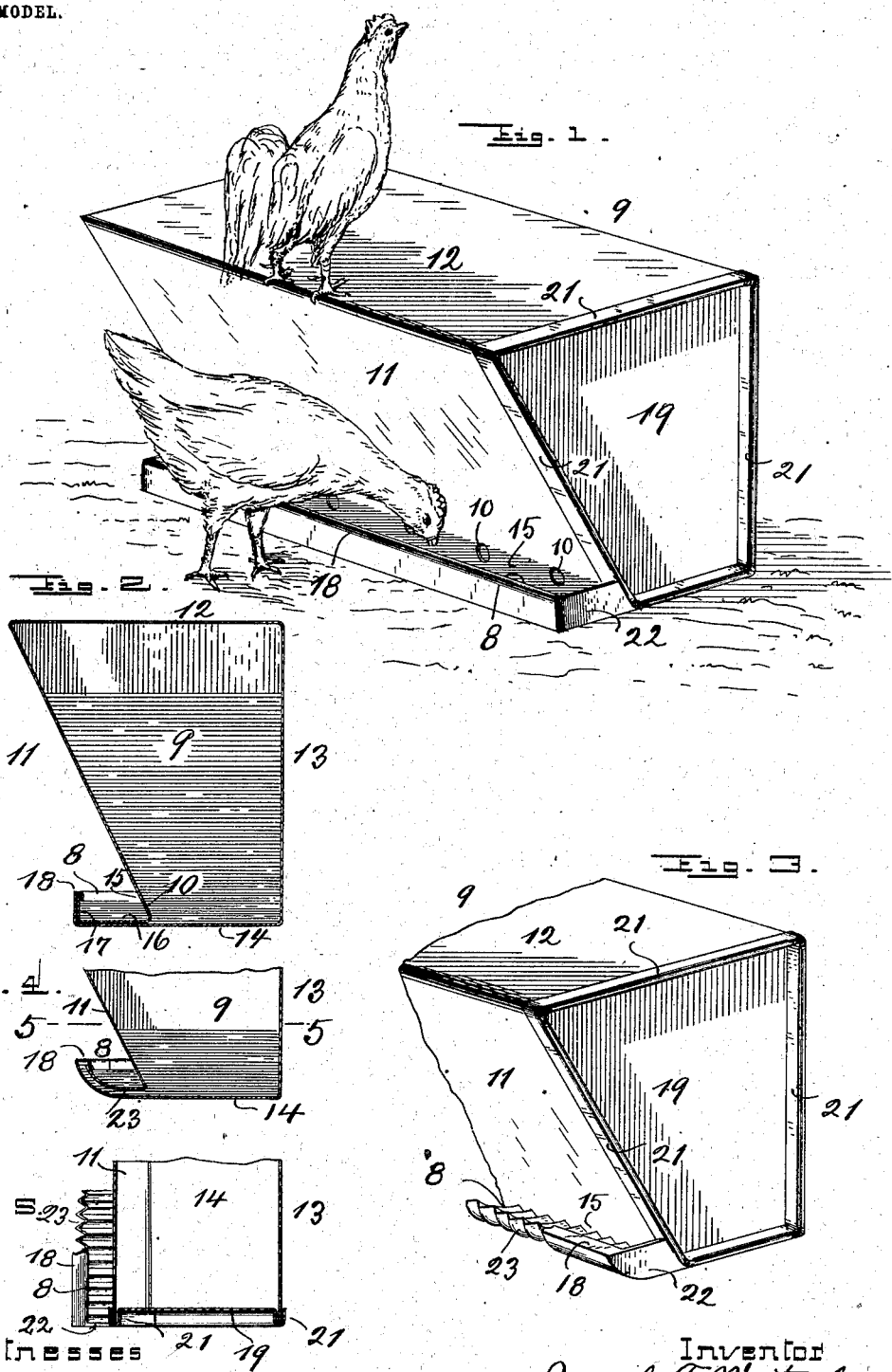
Witnesses
Orrin Cady
Arthur Kline
Inventor
Jacob F. Weitzel
by C. Spengel atty.

No. 729,821. Patented June 2, 1903.

UNITED STATES PATENT OFFICE.

JACOB F. WEITZEL, OF LUDLOW, KENTUCKY, ASSIGNOR OF ONE-HALF TO JOSEPH G. STEINKAMP, OF CINCINNATI, OHIO.

DRINKING-TROUGH FOR DOMESTIC ANIMALS.

SPECIFICATION forming part of Letters Patent No. 729,821, dated June 2, 1903.

Application filed August 18, 1902. Serial No. 119,998. (No model.)

*To all whom it may concern:*

Be it known that I, JACOB F. WEITZEL, a citizen of the United States, and a resident of Ludlow, in the county of Kenton and State of Kentucky, have invented certain new and useful Improvements in Drinking-Troughs for Domestic Animals; and I do declare the following to be a clear, full, and exact description thereof, attention being called to the accompanying drawings, with the reference-numerals marked thereon, which form also a part of this specification.

This invention relates to improvements in drinking-troughs for domestic animals, particularly poultry, and comprises two features, of which one is the shape of the device, which is such as to protect the contents of the trough and keep it clean, particularly against such filth and pollution as may result from chickens while they sit or roost on the device.

The other feature relates to the construction of the device, which while fully efficient for the purpose is carried out in the most simple manner possible.

In the following specification, and particularly pointed out in the claims following, is found a full description of the invention, together with its mode of manufacture, parts, and construction, which latter is also illustrated in the accompanying drawings, in which—

Figure 1 shows in a perspective view the device ready for use. Fig. 2 is a vertical cross-section thereof. Fig. 3, in part of a perspective view similar to Fig. 1, shows the device somewhat modified. Fig. 4 is a cross-section similar to Fig. 2 of the device embodying the modified features shown in Fig. 3. Fig. 5 is a horizontal section of Fig. 4 on line 5 5 thereof.

8 is the trough of the device, and 9 the reservoir from which it is supplied. This supply is constant and automatic, proceeding, as shown in Figs. 1 and 2, through openings 10 in the rear wall of this trough, and whereby this latter communicates with the reservoir. The highest part or upper edge of these openings determines the height of the water-level within the trough and is below the upper edge of the same. This, as well as the automatic supply, is due to the fact that the reservoir being absolutely air-tight and without any openings does not provide for admission of air to serve as a vent except through openings 10, which are, however, kept constantly closed by the water passing from the lower part of the reservoir into the trough and keeping this latter always full. The reservoir consists of the front 11, top 12, back 13, and bottom 14, which parts in the preferred construction are all formed out of one piece. The lower part of the front serves also as the back 15 of the trough, and, further, by being turned outwardly and then upwardly again serves also as bottom 16 and front 17 of the same. The ends of this one-piece structure are joined by extending bottom 14 of the reservoir forwardly around the trough and in over the upper edge of the same, at which edge a clenched lock-seam is formed, as shown at 18. The open ends of the reservoir are closed by heads 19, cut to shape and having their edges double-flanged, as shown at 21, to receive between these flanges the edges of the body of the reservoir against which the heads are shoved. The connection and formation of the joint is completed by the application of solder. It will be noted that the ends or edges of the reservoir-shell are held between these flanges 21, so that the solder connection is not subjected to any strain. The ends of the trough are closed by separate pieces 22. The bottom and front side of the trough may also be merged into a curve, as shown in Figs. 3 and 4. In place of holes communication between reservoir and trough may also be established between the overlying parts of the trough, the water coming out at seam 18, which in this case is not tightly clenched. More opening may be provided by corrugating the front and bottom walls of the trough, as shown at 23 in Figs. 3, 4, and 5.

The device is filled by slowly immersing it with one of the ends 19 first, whereby the air is given a chance to escape through openings 10 near the other end, which are not under water.

By having front wall 11 more inclined, preventing access of larger animals to the trough, the device may also be used as a trap to expose poison for smaller animals, like rats, for instance.

It will be observed that the bulk of the water being completely inclosed is always kept fresh and clean, and nothing can enter it, because the pressure is always from the reservoir toward the trough. If upset, the water cannot empty.

The contents of the trough are also protected by the overhanging front wall of the reservoir, which prevents anything dropping into the water from above and keeps also chickens from stepping into it. Pullets and small chickens cannot fall into it, since the trough is too small and need not carry water more than one-half inch deep.

Freezing and thawing will not have any serious effects on this device, since by reason of the particular shape, widening toward the top, the release of the ice will be favored without straining or bursting the reservoir.

Having described my invention, I claim as new—

1. In a drinking-trough for the purpose described, the combination of a substantially box-shaped reservoir, a trough arranged along the lower edge of its front side, which latter inclines outwardly so as to overhang the trough and the lower part of which front side forms also the rear wall of the trough and a row of openings extending along this part of the front wall from end to end of the structure, said openings serving as a means to establish communication between the trough and the otherwise air-tight reservoir and the imperforate walls inclosing the same, part of said openings when the structure is upset endwise and partially immersed serving also as fill-openings while the remaining openings above provide for the air-vent.

2. In a drinking-trough for the purpose described, the combination of a reservoir and a trough in open communication therewith, the former being closed air-tight above such communication, the trough being arranged along the lower part of one of the sides of the reservoir, said parts being made of sheet metal, one piece of which is shaped and bent to form the sides of the reservoir and also the sides of the trough and separate end pieces to close the ends of the reservoir and trough.

3. In a drinking-trough for the purpose described, the combination of a reservoir and a trough in open communication therewith, the former being closed air-tight above such communication, the trough being arranged along the lower part of one of the sides of the reservoir, said parts being made of sheet metal, one piece of which is shaped and bent to form the sides of the reservoir and also the sides of the trough and separate heads to close the open ends of the reservoir, they being double-flanged around their edges and adapted to engage the edges of the shell formed of one piece.

4. In a drinking-trough for the purpose described, the combination of a reservoir, a trough in open communication therewith, the former being closed air-tight above such communication, the trough being arranged along the lower part of one of the sides of the reservoir, said parts being made of one piece of sheet metal which is shaped and bent to form the sides of the reservoir and also the sides of the trough, the metal being doubled at the bottom and front side of the trough and one turned over the other at the upper edge of this front side and separate end pieces to close the open ends of the reservoir and trough.

5. In a drinking-trough for the purpose described, the combination of a reservoir, a trough arranged along the lower part of one of the sides, said parts being made of one piece of sheet metal which is shaped and bent to form the sides of the reservoir and also the sides of the trough, the metal being doubled at the bottom and front side of the trough and in engagement at the upper edge of this front side, corrugations in the metal of the trough to form water-passages from the reservoir to the trough, the former being otherwise closed air-tight and separate end pieces to close the open ends of the reservoir and trough.

In testimony whereof I hereunto set my signature in the presence of two witnesses.

JACOB F. WEITZEL.

Witnesses:
C. SPENGEL,
ARTHUR KLINE.